United States Patent [19]

Van den Berg et al.

[11] Patent Number: 4,686,041
[45] Date of Patent: Aug. 11, 1987

[54] MOLECULAR DIFFERENTIATION FILTER

[76] Inventors: Teunis T. Van den Berg, 1171 Pinion Ave., P.O. Box 2470, Big Bear, Calif. 92314; Thomas D. Eastlack, 5639 Klusman, Alta Loma, Calif. 91701

[21] Appl. No.: 785,872

[22] Filed: Oct. 9, 1985

Related U.S. Application Data

[63] Continuation-in-part of Ser. No. 674,969, Nov. 26, 1984, abandoned.

[51] Int. Cl.⁴ .............................................. B01D 29/46
[52] U.S. Cl. .................................... 210/335; 210/435; 210/488; 55/278; 55/485; 55/489
[58] Field of Search ............... 210/314, 483, 488, 492, 210/498, 335, 323.1, 339, 340, 435; 55/278, 482, 485, 486, 488, 489

[56] References Cited

U.S. PATENT DOCUMENTS

| | | | |
|---|---|---|---|
| 1,793,583 | 2/1931 | Bowden | 55/233 |
| 1,977,174 | 10/1933 | Crawford | 210/492 |
| 1,992,101 | 2/1935 | Stuart | 210/323.2 |
| 2,118,295 | 5/1938 | Crawford | 138/42 |
| 2,330,945 | 10/1943 | Becker | 55/278 |
| 2,455,486 | 12/1948 | Hicks | 210/492 |
| 2,495,095 | 1/1950 | Ewbank | 210/492 |
| 2,548,584 | 4/1951 | Briggs | 210/457 |
| 2,581,337 | 1/1952 | Lapik | 210/446 |
| 2,635,641 | 4/1953 | Kasten | 55/278 |
| 2,702,637 | 2/1955 | Shepard | 210/492 |
| 3,397,794 | 8/1968 | Toth | 210/488 |
| 3,647,084 | 3/1972 | Martin | 210/492 |
| 3,648,843 | 3/1972 | Pearson | 210/443 |
| 3,827,568 | 8/1974 | Toth | 210/448 |
| 3,917,222 | 11/1975 | Kay | 251/127 |
| 4,269,613 | 5/1981 | Miko et al. | 55/278 |
| 4,410,430 | 11/1983 | Hagler | 210/446 |

Primary Examiner—Richard V. Fisher
Assistant Examiner—Wanda L. Millard
Attorney, Agent, or Firm—Limbach, Limbach & Sutton

[57] ABSTRACT

A molecular differentiation filter for filtering particles in the sub-mil range comprises a body having two chambers, a first chamber and a second chamber, the first and second chambers being defined by a chamber dividing member. The filter also comprises an inlet that is in communication with the second chamber, an outlet that is in communication with the first chamber, and a plurality of coaxial, stacked discs mounted onto the chamber dividing member, the plurality of discs resides entirely in the second chamber. The discs comprise alternating filtering discs and separation discs, wherein each of the filtering discs is a generally smooth-surfaced disc that has a filtering perimetrical edge and a plurality of substantially identical filtrate holes spaced inwardly from the perimetrical edge. In addition, each of the separation discs is a generally smooth-surfaced disc that has a plurality of substantially identical, radially-extending separation tips, and a thickness, whereby the thickness of the separation disc positioned coaxially between two adjacent filtering discs defines a filtering spacing in the sub-mil range.

16 Claims, 8 Drawing Figures

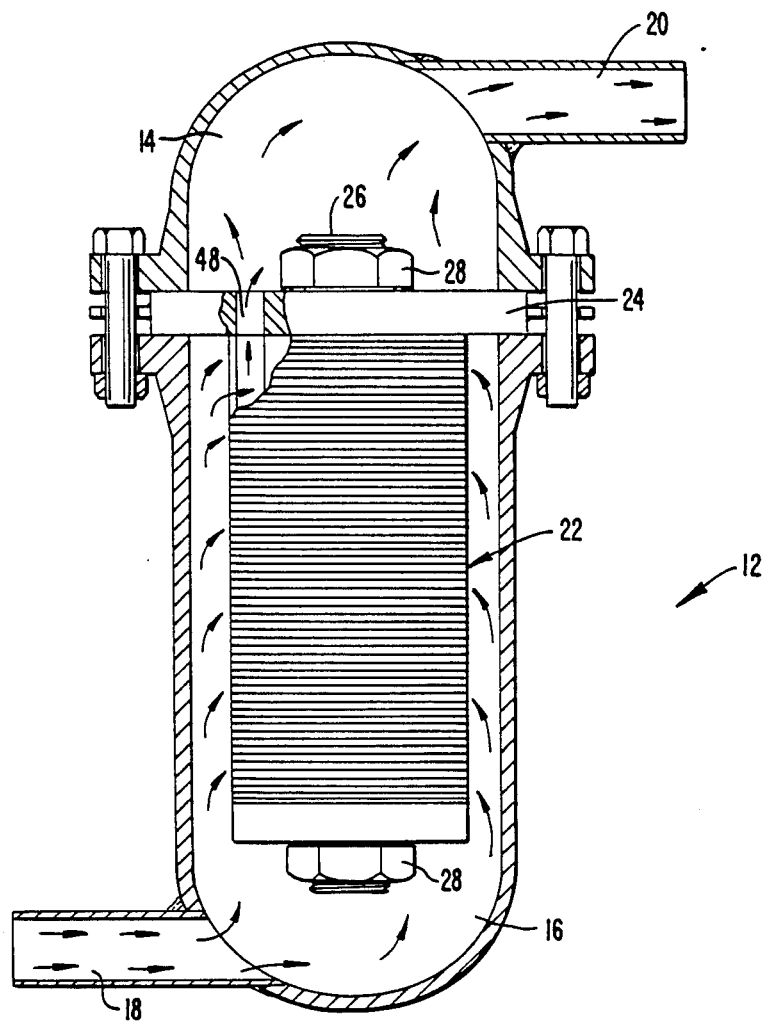
FIG._1.

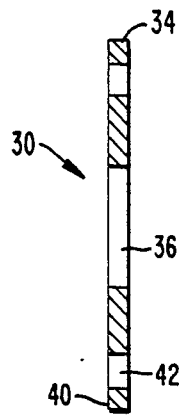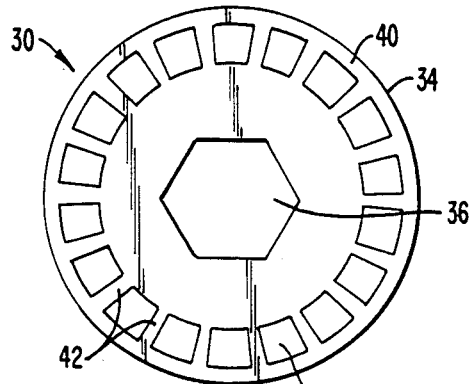
FIG._2A.   FIG._2B.
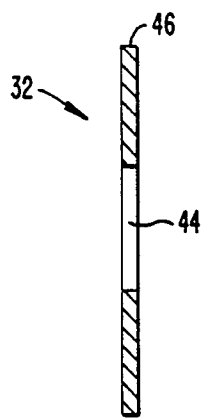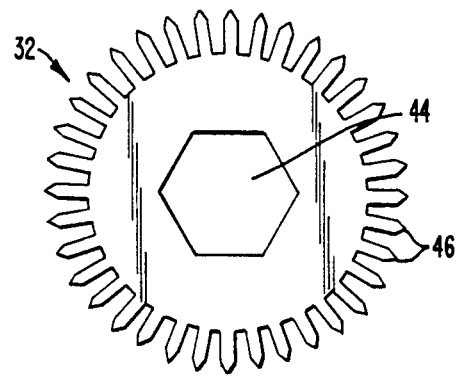
FIG._3A.   FIG._3B.

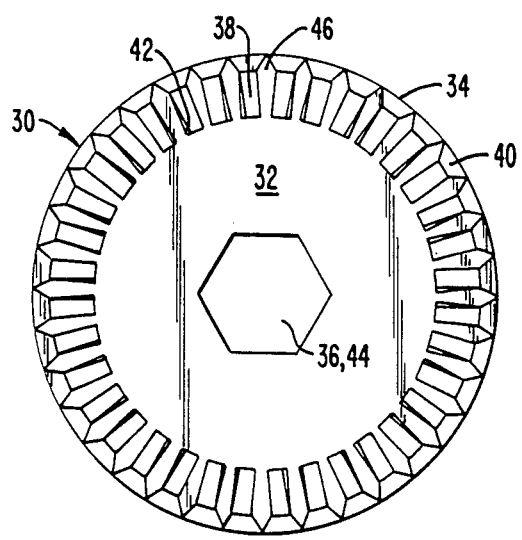
FIG._4.
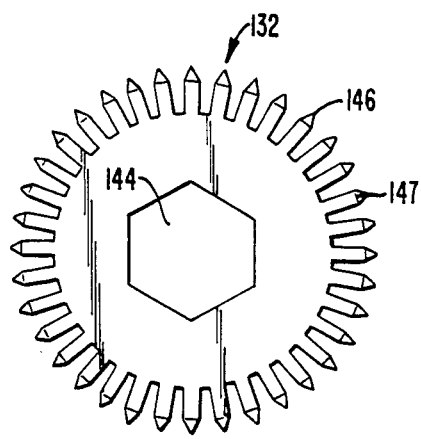
FIG._5.
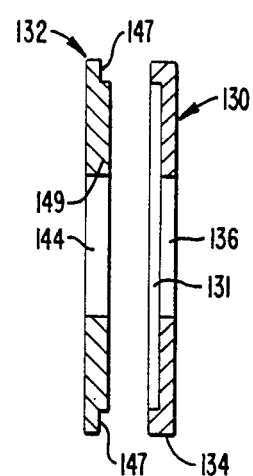
FIG._6.

MOLECULAR DIFFERENTIATION FILTER

CROSS-REFERENCE TO RELATED APPLICATION

This application is a continuation-in-part of application Ser. No. 674,969, filed Nov. 26, 1984, now abandoned.

TECHNICAL FIELD

This invention relates to stack disc filters, and more particularly, to stack disc filters capable of filtering sub-mil and sub-micron molecules.

BACKGROUND ART

Filters generally consist of a fine mesh screen that is capable of stopping particles which are entrained in a fluid stream that is passing through the screen. The size of the particles, naturally, must be greater than the size of the mesh. To capture particles having diameters less than 100 microns, the use of such mesh screens is generally impossible in that meshes of such sizes are difficult to manufacture. Stack disc filters, therefore, are used for capturing minute particles of this size range. When particles are in the range of 5 to 25 microns, prior art stack disc filters generally employ filtering discs which have etched passageways, undulating surfaces or roughened surfaces. This dimensional range is also known as the sub-mil range since one mil, one-thousandth of an inch, is approximately 25 microns. Examples of filters employing such filtering discs include Hagler, Jr., U.S. Pat. Nos. 4,410,430; Pearson, 3,648,843; and Toth et al., 3,397,794. These filters, however, contain several deficiencies one of which being the added expense of manufacturing the passageways, the undulations and the roughened surfaces. Another deficiency is the necessity of using higher pressures to propel fluid through these filtering discs. Moreover, such filters are difficult to clean. In any event, none of the prior art filters is capable of filtering particles which are less than one micron in diameter.

DISCLOSURE OF THE INVENTION

In view of the prior art, it is a major object of the present invention to provide a molecular differentiation filter that utilizes smooth-surfaced filtering discs to filter particles in the sub-mil range.

It is another object of the present invention to provide a molecular differentiation filter that utilizes a lower pressure for propelling fluid therethrough.

It is a further object of the present invention to provide a molecular differentiation filter that is easy to clean.

It is a still further object of the present invention to provide a molecular differentiation filter that is capable of filtering particles which are in the sub-micron range.

In order to accomplish the above and still further objects, the present invention provides a molecular differentiation filter for filtering particles in the sub-mil range comprises a body having two chambers, a first chamber and a second chamber, the first and second chambers being defined by a chamber dividing member. The filter also comprises an inlet that is in communication with the second chamber, an outlet that is in communication with the first chamber, and a plurality of coaxial, stacked discs mounted onto the chamber dividing member, the plurality of discs resides entirely in the second chamber. The discs comprise alternating filtering discs and separation discs, wherein each of the filtering discs is a generally smooth-surfaced disc that has a filtering perimetrical edge and a plurality of substantially identical filtrate holes spaced inwardly from the perimetrical edge. In addition, each of the separation discs is a generally smooth-surfaced disc that has a plurality of substantially identical, radially-extending separation tips, and a thickness, whereby the thickness of the separation disc positioned coaxially between two adjacent filtering discs defines a filtering spacing in the sub-mil range.

Other objects, features and advantages of the present invention will appear from the following detailed description of the best mode of a preferred embodiment, taken together with the accompanying drawings.

BRIEF DESCRIPTION OF THE DRAWINGS

FIG. 1 is a cross section, diagrammatical view of a molecular differentiation filter of the present invention, partially broken away;

FIG. 2A is an enlarged, cross section view of a filtering plate of the molecular differentiation filter of FIG. 1;

FIG. 2B is a plan view of the filtering plate of FIG. 2A;

FIG. 3A is an enlarged, cross section view of a separation plate of the molecular differentiation filter of FIG. 1;

FIG. 3B is a plan view of the separation plate of FIG. 3A;

FIG. 4 is a plan view of both the filtering plate and the separation plate of FIGS. 2B and 3B, respectively;

FIG. 5 is a plan view of an alternative embodiment of the separation plate of FIGS. 3A and 3B; and FIG. 6 is an enlarged, cross section view of both the alternative separation plate of FIG. 5 and an alternative embodiment of the filtering plate of FIGS. 2A and 2B.

BEST MODE FOR CARRYING OUT THE INVENTION

Referring to FIG. 1, there is shown a molecular differentiation filter, designated 12. Filter 12 is a generally cylindrical body that is divided into two chambers, an upper or first chamber 14 and a lower or second chamber 16. In addition, filter 12 includes an inlet 18 that is in communication with lower chamber 16 and an outlet 20 that is in communication with upper chamber 14.

More particularly, filter 12 includes a plurality of coaxial, stacked discs 22. Discs 22 are mounted onto a radially-extending horizontal member 24. Member 24 divides the cylindrical body into the two chambers—chambers 14 and 16. Discs 22 are mounted onto horizontal member 24 in a conventional fashion, e.g., utilizing an axially-extending threaded member 26 and a pair of nuts 28. The plurality of discs 22 resides entirely in lower chamber 16.

As best shown in FIGS. 2A–3B, the plurality of disc 22 comprises an alternating series of filtering discs 30 and separation discs 32. In particular, filtering disc 30 is a generally circular, smooth-surfaced disc that has a filtering perimetrical edge 34, a central opening 36, and a plurality of substantially identical filtering or filtrate holes 38 spaced radially and outwardly from central opening 36. Filtrate holes, however, do not come into contact with filtering edge 34, but rather, leave a periphery 40 between themselves and perimetrical edge 34. In addition, the remaining portions of filtering disc 30 which lie between filtrate holes 38 are designated as spokes 42.

The term "smooth surface" in the present invention refers to surfaces of discs 30 which have an arithmetical average (AA) surface roughness of approximately two to ten microinches. The AA measurement is a conventional measurement defined in the *Machinery Handbook*. In addition, one microinch is one-millionth of an inch. In contrast, comparable prior art discs have surface roughness in the range of 63-350 microinches.

As for separation disc 32, as best shown in FIGS. 3A and 3B, it is also a generally circular, smooth-surfaced disc that has a central opening 44 and a plurality of substantially identical, radially-extending separation tips 46. Separation tips 46 define an imaginary perimeter, not shown, that coincides with perimetrical edge 34 of filtering disc 30. Smooth surface has the same surface roughness range of two to ten microinches.

To assemble filter 12, alternating filtering disc 30 and separation disc 32 are positioned such that central openings 36 and 44 are in coincidence so as to receive threaded member 26. Filtering disc 30 and separation disc 32 each is a thin, metallic, smooth-surfaced disc. Discs 30 and 32 each has a diameter of approximately three inches. The thickness of each disc in the preferred embodiment is approximately 10 microns. Discs 30 and 32 are manufactured from stainless steel, which have been milled by conventional techniques to approximately 10 microns. As best shown in FIG. 4, the relationship of filtering disc 30 and separation disc 32 is that alternating ones of separation tips 46 are positioned directly atop spokes 42. In addition, alternating ones of tips 46 radially astride one of filtrate holes 38. The placement of separation disc 32 between two filtering discs 30 is to perform two functions one of which is to maintain a filtering spacing, not shown, of approximately 10 microns between adjacent, alternating filtering discs 30, especially the spacing between adjacent filtering perimetrical edges 34. These spacings between adjacent filtering discs 30 or filtering edges 34 perform the filtering function of filter 12, i.e., a spacing of 10 microns would stop particles which are greater than this dimension. The second function of separation tips 46, especially those which are positioned atop spokes 42, is to enhance the physical structural integrity of the plurality of discs 22.

In use, alternating filtering discs 30 and separating discs 32 are stacked and mounted onto horizontal member 24. Discs 30 and 32 are compressed together in order to maintain a filtering spacing of approximately 10 microns between two adjacent filtering edges 34 of filtering discs 30.

As best shown in FIG. 1, horizontal member 24 has at least one opening 48 that communicates with both lower chamber 16 and upper chamber 14. Horizontal member opening 48 is in communication with one set of filtrate holes 38 such that that set of filtrate holes 38 essentially creates a fluid passageway or conduit for the filtrate, as best shown in FIG. 1. In the preferred embodiment, horizontal member 24 has as many openings 48 as there are filtrate holes 38 on a filtering disc 30.

In operation, a fluid entrained with particles first enters inlet 18 and proceeds in an upwardly directed fashion in lower chamber 16. Since the only outlet between lower chamber 16 and upper chamber 14 is horizontal member openings 48, fluid must flow from the perimeter of the stacked discs 22, e.g., perimetrical edges 34 of filtering discs 30, pass peripheries 40 of filtering discs 30, and enter filtrate holes 38. As the fluid encounters and passes filtering edges 34 and enters peripheries 40, filtering edges 34 perform their filtering function by stopping the passage of particles which are greater than the filtering spacing between two adjacent filtering edges, e.g., 10 microns. These filtering properties and characteristics are well within the knowledge of one skilled in the art. Moreover, since discs 22, and especially filtering peripheries 40, are smooth-surfaced, they do not create fluid resistances which are present in prior art etched surfaces. Thus, a lesser pressure is needed to propel fluid through filter 12. As described before, each set of coaxial filtrate holes 38 essentially creates a conduit such that the filtered fluid or filtrate in that set of filtrate holes 38 would proceed upward, pass through a coaxially-oriented horizontal member opening 48 and enter upper chamber 14. The filtrate in upper chamber 14 then exits via outlet 20. To clean filter 12, back flow of fluid at approximately 300 psi would clean off the debris of particles that has adhered to filtering edges 34.

As best shown in FIGS. 5 and 6, an alternative embodiment to filter 12 is illustrated. Alternative filter 112 has discs 122 portions of which are reduced in their thickness so as to filter particles from approximately 10 microns to the sub-micron range, e.g., down to diameters of 0.25 micron. Since many elements of the alternative embodiment are similar to elements of the preferred embodiment, a numeral "1" is added to the numerals which designate corresponding elements of the preferred embodiment. For example, the filtering disc in the alternative embodiment is designated 130.

In the alternative embodiment, separation disc 132 has separation tips 146 which have been reduced in thickness. In particular, the apical point 147 of each separation tip 146 is reduced in thickness such that the filtering spacing between two adjacent filtering edges 134 of adjacent filtering discs 130 is capable of filtering particles from approximately 10 microns to the sub-micron range. In addition, the central portion 131 of filtering disc 130 is also reduced in thickness, as best shown in FIG. 6. Central portion 131 generally encompasses that portion of filtering disc 130 between filtrate holes 138 and central opening 136 and some portion of each spoke 142. Reduced central portion 131 is, therefore, capable of receiving the unreduced portion 149 of separation disc 132 in a generally mated fashion.

An exemplary alternative embodiment that is capable of filtering five-micron particles has the following dimensions: thickness of separation disc 132 approximately one mil; thickness of apical point 147 approximately 0.20 mil; thickness of filtering disc 130 approximately four mils; and thickness of depressed central portion 131 approximately 3.1 mils.

Similar to the surfaces of the preferred embodiment, all surfaces of discs 130 and 132 are smooth surfaced. In addition, the reduction of the thicknesses of the various portions of discs 130 and 132 is accomplished by using conventional etching techniques common to the semiconductor industry. Moreover, the plurality of stacked discs 122 in the alternative embodiment is compressed by a pressure of at least 10,000 pounds so as to maintain the filtering opening between two adjacent filtering discs 132 at approximately 0.25 micron.

It will be apparent to those skilled in the art that various modifications may be made within the spirit of the invention and the scope of the appended claims. For example, although filtering discs 30 and separation discs 32 have idential thickness in the preferred embodiment, they need not be identical, i.e., filtering discs 30 may have a thickness of 15 microns and separation discs 32 ten microns.

We claim:

1. A molecular differentiation filter for filtering particles in the sub-mil range, comprising
   a body having two chambers, a first chamber and a second chamber, said first and second chambers being defined by a chamber dividing member;
   an inlet that is in communication with said second chamber;
   an outlet that is in communication with said first chamber; and
   a plurality of coaxial, stacked discs mounted onto said chamber dividing member, said plurality of discs resides entirely in said second chamber, wherein said discs comprise alternating filtering discs and separation discs, and further wherein
      each of said filtering discs is a generally smooth-surfaced disc that has a filtering perimetrical edge, a plurality of substantially identical filtrate holes spaced inwardly from said perimetrical edge, and a plurality of spokes each of which is positioned between two of said filtrate holes; and
      each of said separation discs is a generally smooth-surfaced disc that has a plurality of substantially identical, radially-extending separation tips, and a thickness, wherein alternating ones of said separation tips are juxtaposed with said filtering disc spokes and remaining ones of said separation tips are juxtaposed with said filtering disc filtrate holes such that each of said remaining separation tips bridges one of said filtrate holes;
   whereby said thickness of said separation disc positioned coaxially between two adjacent said filtering discs defines a filtering spacing in said sub-mil range.

2. The molecular differentiation filter as claimed in claim 1, wherein said thickness of said separation disc is in the range of approximately ten to 25 microns, thereby defining said filtering spacing.

3. The molecular differentiation filter as claimed in claim 1 or 2, wherein said chamber dividing member has at least one opening that is in communication with a set of said filtering disc filtrate holes of said filtering discs so as to permit communication between said second chamber and said first chamber.

4. The molecular differentiation filter as claimed in claim 3, wherein said smooth-surfaced disc has an AA range of approximately two to ten microinches.

5. In a stacked disc filter for filtering particles in the sub-mil range which are entrained in a fluid, said filter comprising a plurality of alternating, coaxial filtering discs and separation discs, wherein the thickness of said separation disc positioned coaxially between two adjacent said filtering discs defines a filtering spacing in said sub-mil range, the improvement wherein
   each of said filtering discs is a generally smooth-surfaced disc that has a filtering perimetrical edge, a plurality of substantially identical filtrate holes spaced inwardly from said perimetrical edge, and a plurality of spokes each of which is positioned between two of said filtrate holes; and
   each of said separation discs is a generally smooth-surfaced disc that has a plurality of substantially identical, radially-extending separation tips, wherein alternating ones of said separation tips are juxtaposed with said filtering disc spokes and remaining ones of said separation tips are juxtaposed with said filtering disc filtrate holes such that each of said remaining separation tips bridges one of said filtrate holes;
   whereby said filtering perimetrical edges of said filtering discs filter said particles from said fluid.

6. The improvement as claimed in claim 5, wherein said thickness of said separation disc is in the range of approximately ten to 25 microns, thereby defining said filtering spacing.

7. The improvement as claimed in claim 5 or 6, wherein said filter includes a chamber dividing member that defines a first chamber and a second chamber that has said discs positioned therein, and furtherwherein said chamber dividing member has at least one opening that is in communication with a set of said filtering disc filtrate holes of said filtering discs so as to permit communication between said second chamber and said first chamber.

8. The improvement as claimed in claim 7, wherein said smooth-surfaced disc has an AA range of approximately two to ten microinches.

9. A molecular differentiation filter for filtering particles, comprising
   a body having two chambers, a first chamber and a second chamber, said first and second chambers being defined by a chamber dividing member;
   an inlet that is in communication with said second chamber;
   an outlet that is in communication with said first chamber; and
   a plurality of coaxial, stacked discs mounted onto said chamber dividing member, said plurality of discs reside entirely in said second chamber, wherein said discs comprise alternating filtering discs and separation discs, wherein
      each of said separation discs is a generally smooth-surfaced disc that has a plurality of substantially identical, radially-extending separation tips, wherein each of said separation tips has an apical point the thickness of which is less than the remaining portion of said separation disc; and
      each of said filtering disc is a generally smooth-surfaced disc that has a filtering perimetrical edge, a plurality of substantially identical filtrate holes spaced inwardly from said perimetrical edge, and a central, generally circular depression such that the thickness of said depression is less than the thickness of said perimetrical edge so as to receive said remaining portion of said separation disc;
   whereby said thickness of said apical point of said separation disc positioned between two adjacent said perimetrical edges of said filtering discs defines a filtering spacing capable of filtering particles in the sub-mil range.

10. The molecular differentiation filter as claimed in claim 9, wherein said thickness of said apical point of said separation disc is in the range of approximately 10 microns to approximately 0.25 micron, thereby defining said filtering spacing.

11. The molecular differentiation filter as claimed in claim 9 or 10, wherein
   said filtering disc further comprises a plurality of spokes each positioned between two of said filtering disc holes, whereby
   alternating ones of said separation tips are juxtaposed with said filtering disc spokes and remaining ones of said separation tips are juxtaposed with said filtering disc filtrate holes.

12. The molecular differentiation filter as claimed in claim 11, wherein said chamber dividing member has at least one opening that is in communication with a set of said filtering disc filtrate holes of said filtering discs so as to permit communication between said second chamber and said first chamber.

13. In a stacked disc filter for filtering particles in the sub-micron range which are entrained in a fluid, said filter comprising a plurality of alternating, coaxial filtering discs and separation discs, wherein the thickness of said separation disc positioned coaxially between two adjacent said filtering discs defines a filtering spacing in said sub-micron range, the improvement wherein
 each of said separation discs is a generally smooth-surfaced disc that has a plurality of substantially identical, radially-extending separation tips, wherein each of said separation tips has an apical point the thickness of which is less than the remaining portion of said separation disc; and
 each of said filtering disc is a generally smooth-surfaced disc that has a filtering perimetrical edge, a plurality of substantially identical filtrate holes spaced inwardly from said perimetrical edge, and a central, generally circular depression such that the thickness of said depression is less than the thickness of said perimetrical edge so as to receive said remaining portion of said separation disc;
whereby said filtering perimetrical edges of said filtering discs filter said particles from said fluid.

14. The improvement as claimed in claim 13, wherein said thickness of said apical point of said separation disc is in the range of approximately 10 microns to approximately 0.25 micron, thereby defining said filtering spacing.

15. The improvement as claimed in claim 13 or 14, wherein
 said filtering disc further comprises a plurality of spokes each positioned between two of said filtering disc holes, whereby
 alternating ones of said separation tips are juxtaposed with said filtering disc spokes and remaining ones of said separation tips are juxtaposed with said filtering disc filtrate holes.

16. The improvement as claimed in claim 15, wherein said filter includes a chamber dividing member that defines a first chamber and a second chamber that has said discs positioned therein, and furtherwherein said chamber dividing member has at least one opening that is in communication with a set of said filtering disc filtrate holes of said filtering discs so as to permit communication between said second chamber and said first chamber.

* * * * *